(12) United States Patent  (10) Patent No.: US 7,944,497 B2
Uchida  (45) Date of Patent: May 17, 2011

(54) IMAGING DEVICE DRIVER AND PHOTOGRAPHY INSTRUMENT EMPLOYING IT

(75) Inventor: Tamotsu Uchida, Kanagawa (JP)

(73) Assignee: Panasonic Corporation, Osaka (JP)

( * ) Notice: Subject to any disclaimer, the term of this patent is extended or adjusted under 35 U.S.C. 154(b) by 323 days.

(21) Appl. No.: 12/159,020

(22) PCT Filed: Jan. 10, 2007

(86) PCT No.: PCT/JP2007/050163
§ 371 (c)(1),
(2), (4) Date: Jun. 24, 2008

(87) PCT Pub. No.: WO2007/080889
PCT Pub. Date: Jul. 19, 2007

(65) Prior Publication Data
US 2009/0174785 A1    Jul. 9, 2009

(30) Foreign Application Priority Data

Jan. 13, 2006  (JP) .................. 2006-005908

(51) Int. Cl.
*G02B 13/16* (2006.01)
*H04N 5/225* (2006.01)
(52) U.S. Cl. ........ 348/335; 348/340; 348/345; 348/348; 348/208.99
(58) Field of Classification Search .................. 348/335, 348/340, 345, 348, 208.99; 396/52, 55, 133, 396/358; 359/694, 696, 823, 824, 555–557
See application file for complete search history.

(56) References Cited

U.S. PATENT DOCUMENTS

2004/0105168 A1* 6/2004 Hamasaki ............... 359/696
2006/0127074 A1* 6/2006 Noji .......................... 396/55

FOREIGN PATENT DOCUMENTS

EP    1 337 106 A1    8/2003
(Continued)

OTHER PUBLICATIONS

International Search Report for PCT/JP2007/050163 dated Feb. 13, 2007.

*Primary Examiner* — Yogesh K Aggarwal
(74) *Attorney, Agent, or Firm* — RatnerPrestia

(57) ABSTRACT

An image pickup device driving apparatus including an image pickup device holding portion for holding an image pickup device with an image pickup surface directed to a predetermined direction and capable of moving in an optical axis direction; a movable portion provided facing the image pickup device holding portion and capable of moving with respect to the image pickup device holding portion; three inclined portions provided on a surface of any one of the movable portion and the image pickup device holding portion, which faces the other; three spheres provided on a surface of the other of the movable portion and the image pickup device holding portion, which faces the three inclined portions, in a way in which they are respectively brought into contact with the three inclined portions; and a driving portion for moving the movable portion so as to change positions in which the three inclined portions and the three spheres are brought into contact with each other and to move the image pickup device held in the image pickup device holding portion in the optical axis direction with the surface direction of the image pickup surface maintained.

10 Claims, 11 Drawing Sheets

FOREIGN PATENT DOCUMENTS

| | | |
|---|---|---|
| JP | 2-43072 | 3/1990 |
| JP | 4-307505 | 10/1992 |
| JP | 8-298675 | 11/1996 |
| JP | 8-298675 A | 11/1996 |
| JP | 08298675 A * | 11/1996 |
| JP | 11-308500 A | 11/1999 |
| JP | 2000-165733 A | 6/2000 |
| JP | 2002-176580 A | 6/2002 |
| JP | 2003-274229 A | 9/2003 |
| JP | 2005-117253 A | 4/2005 |

* cited by examiner

IMAGING DEVICE DRIVER AND PHOTOGRAPHY INSTRUMENT EMPLOYING IT

This application is a U.S. National Phase Application of PCT International Application PCT/JP2007/050163.

TECHNICAL FIELD

The present invention relates to a photographing apparatus such as a monitoring camera apparatus or a video camera apparatus, and more particularly, to an image pickup device driving apparatus for moving an image pickup device in an optical axis direction of a lens and a photographing apparatus using the same.

BACKGROUND ART

Firstly, a technology of a conventional photographing apparatus is described. Herein, as an example of a photographing apparatus, a monitoring camera apparatus is described.

Recently, a technology related to various monitoring camera apparatuses has been proposed. In particular, in a monitoring camera apparatus for performing a monitoring operation day and night, a technology of disposing an infrared-light cut filter for selectively transmitting visible light and absorbing infrared light on the front surface of an image pickup device and performing photographing in the daytime, and removing the infrared-light cut filter disposed on the front surface of the pickup device and performing photographing with infrared light at night so that night photographing sensitivity increases and night monitoring precision is improved has been proposed.

In a monitoring camera apparatus having such a configuration, an optical path length is different between a case where the photographing is performed using visible light and a case where the photographing is performed using infrared light due to the displacement of the wavelength of light to be used for the photographing by conditions such as the existence of the infrared-light cut filter, and lighting, and the like. For example, there is a problem that if the optical path length is set to an optimal length with respect to the photographing with visible light in the daytime, a photographed image defocuses when the photographing using visible light and infrared light is performed at night.

In order to solve such a problem, for example, a photographing apparatus having a configuration capable of manually adjusting a position of an image pickup device in the optical axis direction if necessary has been practically used. An example of a method for adjusting the position of the image pickup device in the optical axis direction includes a method in which an image pickup device is movably held in the optical axis direction and urged in one direction by an elastic means, and an adjustment ring having a cam mechanism is rotated so as to press the image pickup device in the opposite direction (see, for example, patent document 1).

Furthermore, recently, a monitoring camera apparatus capable of obtaining a sharply focused image at any time of day or night has been proposed, in which when an infrared-light cut filter is disposed on and removed from the optical path, an image pickup device is moved in the optical axis direction to a position having the highest focused value while referring to the focused value of a video signal output from the image pickup device, thereby correcting the difference in the focal length caused by the difference in the optical path length at the time of photographing with visible light and with both visible light and infrared light as mentioned above (see, for example, patent document 2).

In such a monitoring camera apparatus, a lead screw is used for moving the image pickup device, a nut portion rotatably provided to the lead screw is provided, the image pickup device is attached to a chassis whose operation is limited in the optical axis direction by a guide rod, and the lead screw is driven to be rotated by a stepping motor. With such a configuration, by rotating the lead screw by the rotation of the stepping motor, the image pickup device can be moved by a desired distance in the direction of the optical axis of a lens.

However, in the above-mentioned monitoring camera apparatus described in the patent document 2, when the chassis having the image pickup device, which is supported by two axes of the lead screw and the guide rod, moves in the optical axis direction, the image pickup device is moved. Therefore, since it is necessary to provide two axes, the structure becomes larger in the optical axis direction, making it difficult to reduce the size of the apparatus.

Furthermore, as described in the patent document 1, it is thought that an adjustment ring having a cam mechanism is rotated by a motor to control the driving portion to detect a position with the maximum focused value and to be stopped at the position, and thus the position of the image pickup device in the optical axis direction is adjusted. With such a configuration, the problem that the size of the structure is increased in the optical axis direction is solved. However, in general, in the technology described in patent document 1, an urging force of an elastic means for urging the image pickup device to the adjustment ring is designed so that the image pickup device is prevented from moving largely with a small force, that is to say, the torque necessary to rotate the adjustment ring manually is increased. On the other hand, the focused value is detected continuously while the image pickup device is moved in the optical axis and the image pickup device is moved to a position in which the detected value becomes maximum. In order to do so, it is necessary to move the image pickup device smoothly. However, as mentioned above, since the image pickup device is urged with a large force in the direction of the adjustment ring, in order to rotate the adjustment ring, a large motor is needed. Therefore, it is difficult to move the image pickup device smoothly by a small motor with a relatively small driving force.

[Patent Document 1] Japanese Patent Unexamined Publication No. 2000-165733

[Patent Document 2] Japanese Patent Unexamined Publication No. 2003-274229

SUMMARY OF THE INVENTION

The present invention addresses the problems discussed above, and provides an image pickup device driving apparatus capable of moving an image pickup device in the optical axis direction smoothly with a relatively small driving force and a photographing apparatus using the same.

An image pickup device driving apparatus of the present invention includes an image pickup device holding portion for holding an image pickup device with an image pickup surface directed in a predetermined direction and being capable of moving in an optical axis direction; a movable portion provided facing the image pickup device holding portion and capable of moving with respect to the image pickup device holding portion; three inclined portions provided on a surface of any one of the movable portion and the image pickup device holding portion, which faces the other of the movable portion and the image pickup device holding portion; three spheres provided on a surface of the other of the movable portion and the image pickup device holding portion, which faces the three inclined portions, in a way in which the three spheres are respectively brought into contact with the three inclined portions; and a driving portion for moving the movable portion so as to change positions in which the three inclined portions and the three spheres are brought into contact with each other and to move the image pickup device held in the image pickup device holding portion in the optical axis direction with a surface direction of the image pickup surface maintained.

With such a configuration, since three spheres are disposed between the movable portion and the image pickup device holding portion, friction generated between the movable portion and the image pickup device holding portion is reduced. Thus, it is possible to provide an image pickup device driving apparatus capable of smoothly moving an image pickup device in the optical axis direction even with a relatively small driving force.

Furthermore, the movable portion may be rotatable around the optical axis direction, and the driving portion may rotate the movable portion.

With such a configuration, it is possible to realize a configuration capable of moving the image pickup device more smoothly.

Furthermore, the three spheres may have equal diameters.

With such a configuration, it is possible to keep the movable portion and the image pickup device driving portion in parallel with each other with a further simple configuration.

Furthermore, the three spheres may be rotatably provided on the surface of the other of the movable portion and the image pickup device holding portion, which faces the three inclined portions.

With such a configuration, since the three spheres are rotatably held, catch and the like can be reduced and the image pickup device can be moved more smoothly.

Furthermore, the three spheres may be disposed inside indent portions provided on the surface of the other of the movable portion and the image pickup device holding portion, which faces the three inclined portions.

With such a configuration, the three spheres can be rotatably held with a simple configuration of providing the indent portion.

Furthermore, a lens attachment portion to which a lens portion is attached and a plurality of spheres provided between the movable portion and the lens attachment portion may be further included. The movable portion may be movable with respect to the lens attachment portion via the plurality of spheres.

With such a configuration, since a plurality of spheres are disposed also between the movable portion and the lens attachment portion, it is possible to move the image pickup device with a smaller driving force smoothly.

Furthermore, the plurality of spheres may be rotatably provided on the surface of any one of the movable portion and the lens attachment portion, which faces the other side of the movable portion and the lens attachment portion.

With such a configuration, since the plurality of spheres are rotatably provided, catch and the like can be reduced and the image pickup device can be moved smoothly with a smaller driving force.

Furthermore, the plurality of spheres may be disposed inside concave portions provided on a surface of any one of the movable portion and the lens attachment portion, which faces the other of the movable portion and the lens attachment portion.

With such a configuration, the spheres can be rotatably disposed in a simple configuration in which the concave portion is provided and the sphere is disposed inside the concave portion.

Furthermore, an elastic portion for urging the image pickup device holding portion in one direction along the optical axis may be provided. The movable portion may provide the image pickup device holding portion with an urging force in the direction opposite to the one direction.

With such a configuration, it is possible to realize a configuration having a more excellent shock resistance.

Furthermore, the driving portion may be a rotary motor.

With such a configuration, it is possible to realize a further simple configuration.

Next, a photographing apparatus of the present invention includes a lens portion, an image pickup device, an image pickup device driving apparatus of the present invention, and a video signal processing portion for performing video signal processing with respect to a signal output from the image pickup device.

With such a configuration, in the image pickup device driving apparatus, three spheres are disposed between the movable portion and the image pickup device holding portion, friction between the movable portion and the image pickup device holding portion is reduced. Therefore, it is possible to provide a photographing apparatus capable of smoothly moving an image pickup device in the optical axis direction even with a relatively small driving force.

As mentioned above, it is possible to provide an image pickup device driving apparatus capable of smoothly moving an image pickup device in the optical axis direction even with a relatively small driving force and a photographing apparatus using the same.

Figure 1:
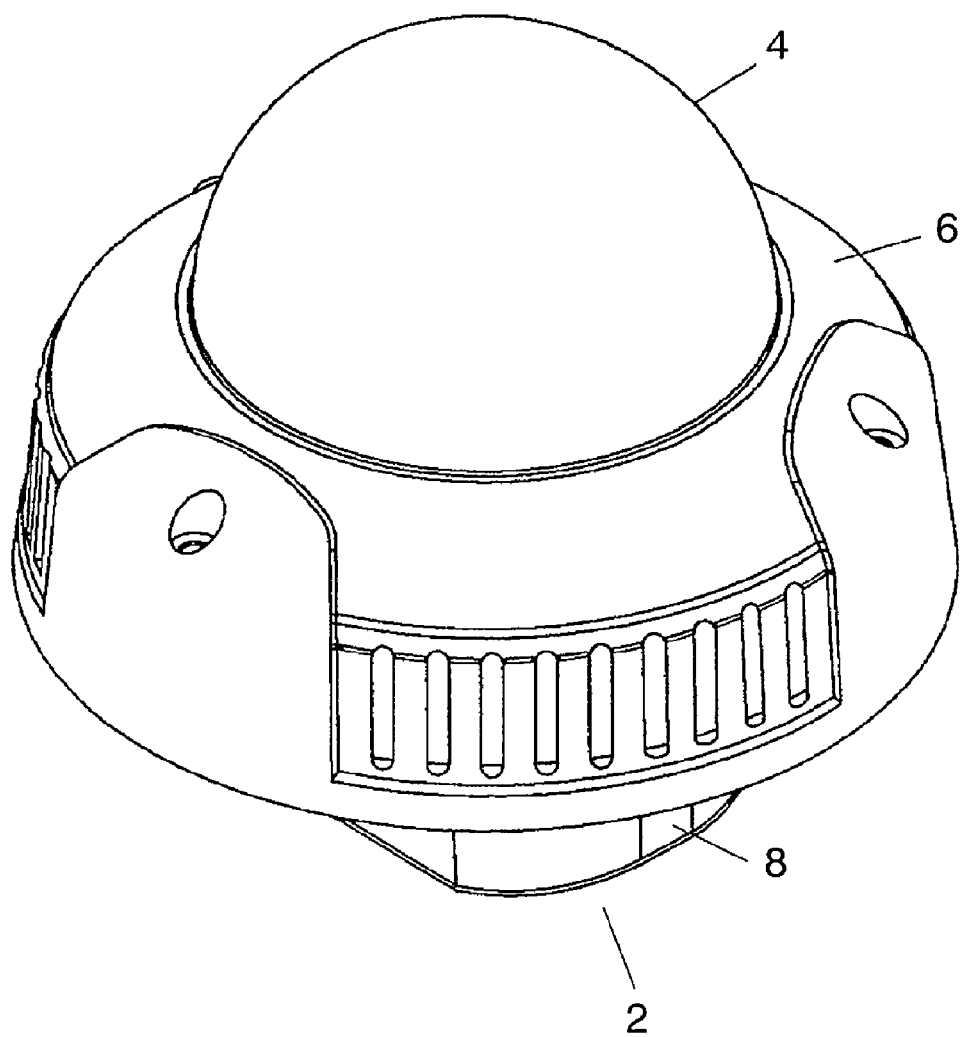
FIG. 1 is a perspective view showing an outer appearance of a photographing apparatus in accordance with an exemplary embodiment of the present invention.

REFERENCE MARKS IN THE DRAWINGS 2 photographing apparatus
4 lens cover portion
6 upper case
8 lower case
10 lens portion
12, 112, 212 lens attachment portion
14, 114, 214 movable portion
16 driving portion
18, 118, 218 image pickup device holding portion
20 substrate
22 image pickup device
24, 124, 224 image pickup device driving apparatus
26, 28, 126, 128, 226, 228 sphere
30, 68 screw portion
32 elastic portion
34 presser portion
36 cam relief portion
38, 138, 238 indent portion
40, 42 gear portion
44, 144, 244 concave portion
46 inner circumferential part
48, 248 sphere receiver surface
50, 150, 250 inclined portion
60, 62 hole portion
66 planetary gear portion
70, 72, 170, 172, 270, 272 wall surface
74 protruding portion
76, 276 bottom surface
78 inclined surface
80 video signal processing portion
82 focused value calculation portion
84 control portion
86 output portion
92, 94 surface
151, 251 convex portion
161, 261 spring portion
191, 291 hole portion

DETAILED DESCRIPTION OF THE PREFERRED EXEMPLARY EMBODIMENTS

Hereinafter, an exemplary embodiment of the present invention is described with reference to drawings.

Exemplary Embodiment

Firstly, a configuration of photographing apparatus 2 in accordance with an exemplary embodiment of the present invention is described. FIG. 1 is a perspective view showing an outer appearance of photographing apparatus 2 in accordance with an exemplary embodiment of the present invention; and FIG. 2 is a sectional view showing a configuration of image pickup device driving apparatus 24 installed in photographing apparatus 2 in accordance with an exemplary embodiment of the present invention.

Firstly, as shown in FIG. 1, photographing apparatus 2 includes lens cover portion 4 for preventing damage by shock from the outside and contamination of dusts, and the like, and which is formed of a member having a high transmittance with respect to a ray of light in the wavelength at which photographing is performed; and upper case 6 and lower case 8 provided so as to cover the below-mentioned image pickup device driving apparatus 24.

Figure 2:
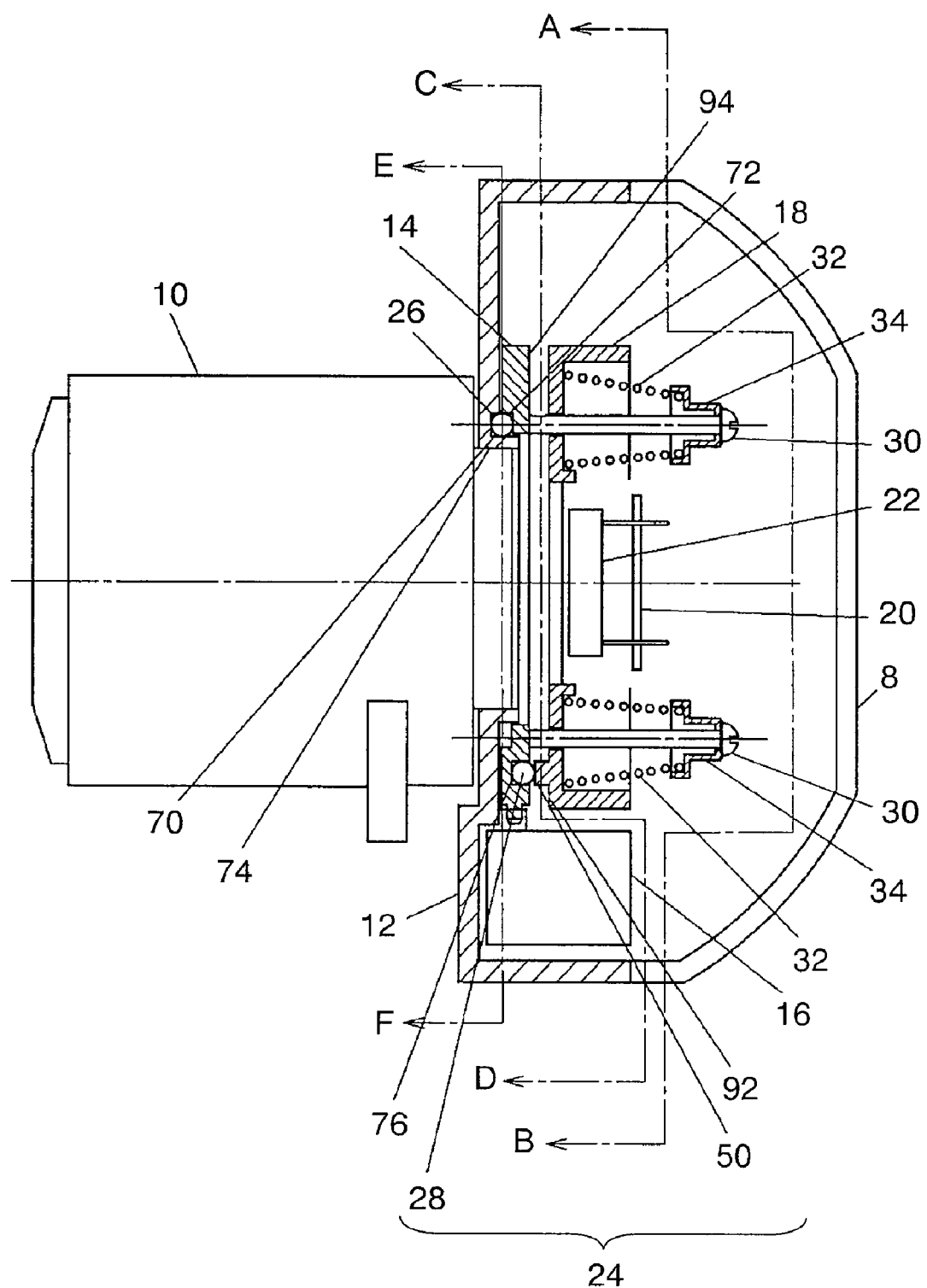
FIG. 2 is a sectional view showing a configuration of an image pickup device driving apparatus installed in a photographing apparatus in accordance with an exemplary embodiment of the present invention.

FIG. 2 shows a sectional structure of lower case 8 in a state in which lens cover portion 4 and upper case 6 are removed from photographing apparatus 2. As shown in FIG. 2, photographing apparatus 2 further includes lens portion 10, lens attachment portion 12 to which lens portion 10 is attached, and image pickup device driving apparatus 24 provided inside lower case 8.

Image pickup device driving apparatus 24 includes annular shaped movable portion 14 provided on lens attachment portion 12 in a way in which it is rotatable around the optical axis of lens portion 10 via six spheres 26 (a plurality of spheres); image pickup device holding portion 18 having three inclined portions 50 attached to movable portion 14 via three spheres 28; substrate 20 attached to image pickup device holding portion 18; image pickup device (image pickup device such as CCD, CMOS censor or the like) 22 attached to substrate 20 in a state in which the image pickup surface is perpendicular to the optical axis thereof; screw portion 30 attached to lens attachment portion 12 via elastic portion 32 so as to elastically hold image pickup device holding portion 18; and driving portion 16 for rotating movable portion 14.

In photographing apparatus 2, as mentioned below, when driving portion 16 rotates movable portion 14, positions in which three spheres 28 of movable portion 14 are brought into contact with three inclined portions 50 of image pickup device holding portion 18 are changed. Thus, the positions of image pickup device holding portion 18 with respect to movable portion 14 and image pickup device 22 held thereby can be changed in the optical axis direction.

As six spheres 26, steel spheres having equal diameters can be used, and as three spheres 28, steel spheres having equal diameters can be used.

As driving portion 16, for example, a rotary stepping motor can be used.

Lens attachment portion 12, movable portion 14 and image pickup device holding portion 18 can be formed respectively by a well-known molding method by using resin, or metal such as aluminum.

As elastic portion 32, a well-known helical spring can be used.

Thus, according to photographing apparatus 2 in accordance with an exemplary embodiment of the present invention, by rotating movable portion 14 by driving portion 16, image pickup device 22 held in image pickup device holding portion 18 can be moved in the optical axis direction in a state in which the image pickup surface is kept in a predetermined direction.

Herein, the relations between components are described in more detail. Firstly, the relation between lens attachment portion 12 and movable portion 14 is described.

Figure 3:
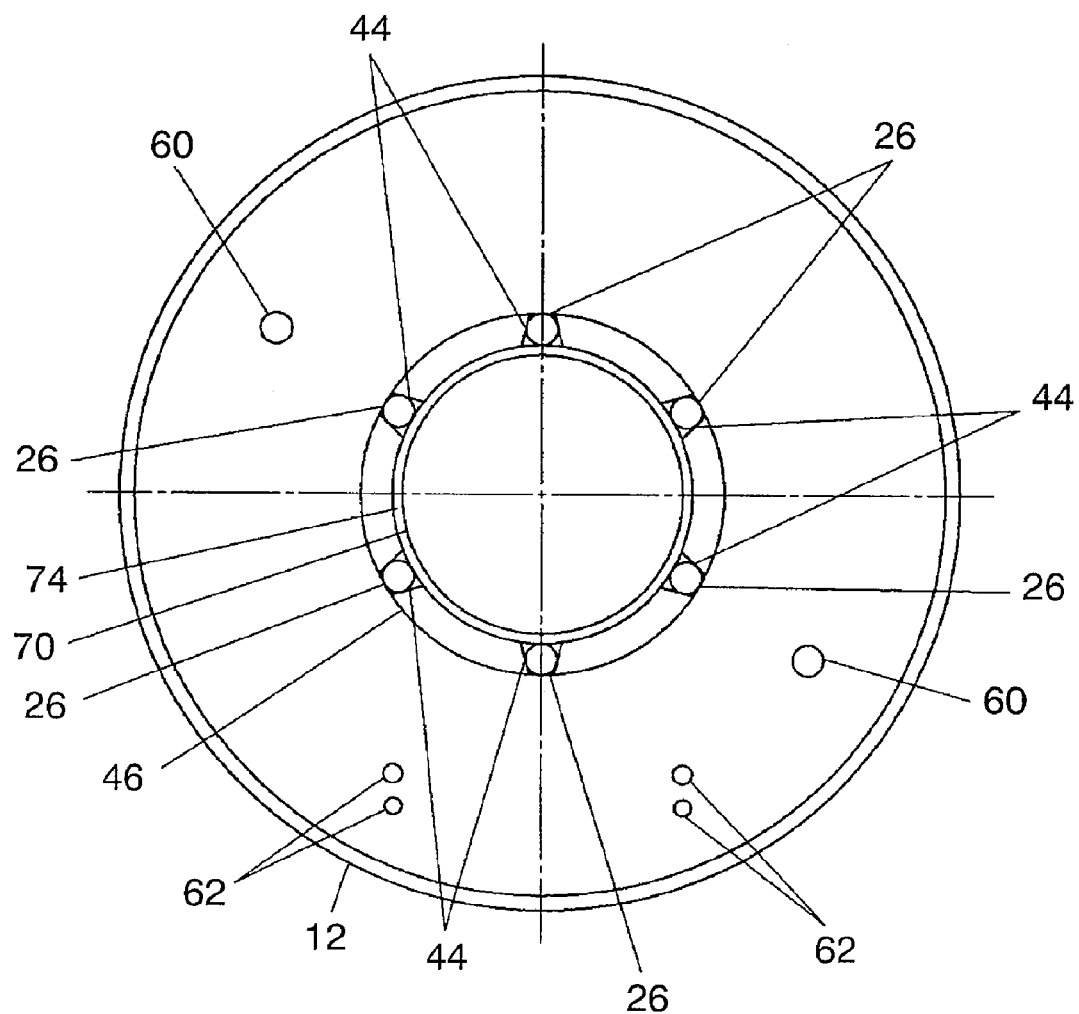
FIG. 3 is a sectional view on arrow E-F of FIG. 2 showing the photographing apparatus seen in the direction of the arrow.

FIG. 3 is a sectional view on arrow E-F of FIG. 2 seen in the direction of the arrow. As shown in FIG. 3, lens attachment portion 12 includes hole portions 60 to which screw portions 30 are attached, hole portions 62 to which driving portion 16 is attached, and six concave portions 44 provided in inner circumferential part 46 and to which six spheres 26 are disposed.

Concave portions 44 are provided in inner circumferential part 46 formed thicker than the other portions, and spheres 26 are disposed in six concave portions 44 respectively as shown in FIG. 3. In order to prevent spheres 26 from falling out from concave portions 44 when movable portion 14 is rotated, it is desirable that concave portion 44 is formed in a way in which its width becomes narrower from the optical axis center (the optical axis of lens portion 10, which is an axis perpendicular to the paper and passes through the intersection of alternate long and short dash lines shown in FIG. 3) to the outer side. Furthermore, it is desirable that concave portion 44 has a dimension having some clearance with respect to the diameter of sphere 26 so that sphere 26 can be rotated inside concave potion 44. Furthermore, it is desirable that concave portions 44 are positioned so that six spheres 26 make an equal angle with respect to the optical axis respectively and six spheres 26 are disposed at an equal distance from the optical axis respectively, that is to say, six spheres 26 are positioned at the vertex of a regular hexagon.

Figure 4:
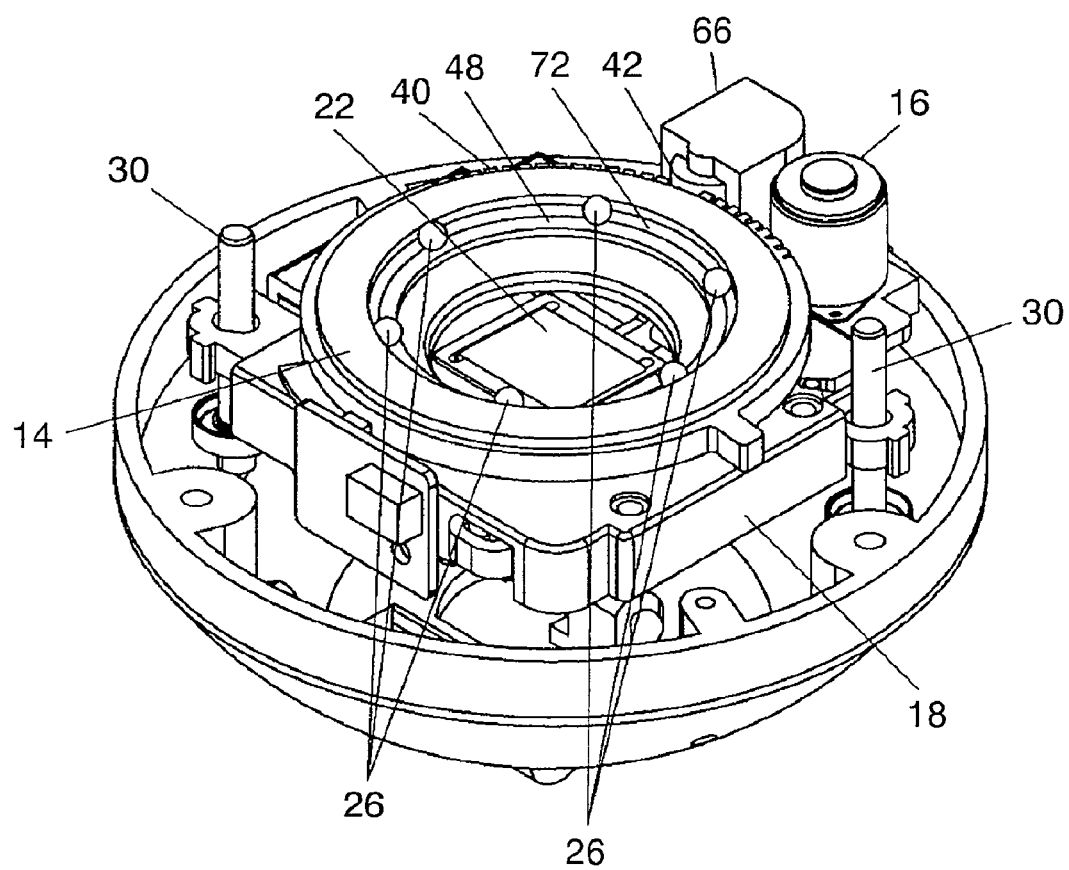
FIG. 4 is a perspective view showing the photographing apparatus in a state in which a lens cover portion, a lens portion, an upper case, and a lens attachment portion are removed.

FIG. 4 is a perspective view showing photographing apparatus 2 in a state in which lens cover portion 4, lens portion 10, upper case 6, and lens attachment portion 12 are removed. As shown in FIG. 4, in inner circumferential part of movable portion 14 of photographing apparatus 2, flat sphere receiver surface 48 with which spheres 26 are brought into contact is provided. As mentioned above, spheres 26 disposed in concave portions 44 of inner circumferential part 46 of lens attachment portion 12 are brought into contact with sphere receiver surface 48 of movable portion 14, held by lens attachment portion 12, and rolled in a state in which the position in the rotation direction is fixed. Thereby, movable portion 14 is rotated with respect to lens attachment portion 12. At this time, when sphere 26 is rotated, friction generated between lens attachment portion 12 and movable portion 14 can be reduced, and at the same time, catch and the like can be also reduced. Furthermore, by disposing sphere 26 as a rigid body between lens attachment portion 12 and movable portion 14, as compared with the case where a material such as resin having a low rigidity is used, a configuration having an excellent shock resistance property can be realized. Note here that sphere 26 may not necessarily be rotated. Since sphere 26 and lens attachment portion 12 as well as sphere 26 and movable portion 14 are respectively brought into point contact with each other, it is possible to reduce friction at the time of rotation of movable portion 14.

Furthermore, since diameters of six spheres 26 are equal to each other and the depths of six concave portions 44 are also equal to each other, the bottom surface of concave portion 44 of lens attachment portion 12 and sphere receiver surface 48 of movable portion 14 can be kept to be parallel with each other. At this time, since the position in the rotation direction of sphere 26 around the optical axis is fixed by concave portion 44 of lens attachment portion 12, lens attachment portion 12 can hold movable portions 14 in well balance by six spheres 26 disposed at equal intervals.

Furthermore, as shown in FIG. 2, since sphere 26 is brought into contact with wall surface 70 at the outer side of protruding portion 74 provided at the inner side of lens attachment portion 12 and wall surface 72 provided at the inner side of movable portion 14 respectively, it is possible to prevent the displacement of movable portion 14 with respect to lens attachment portion 12 in the direction perpendicular to the optical axis.

Figure 5:
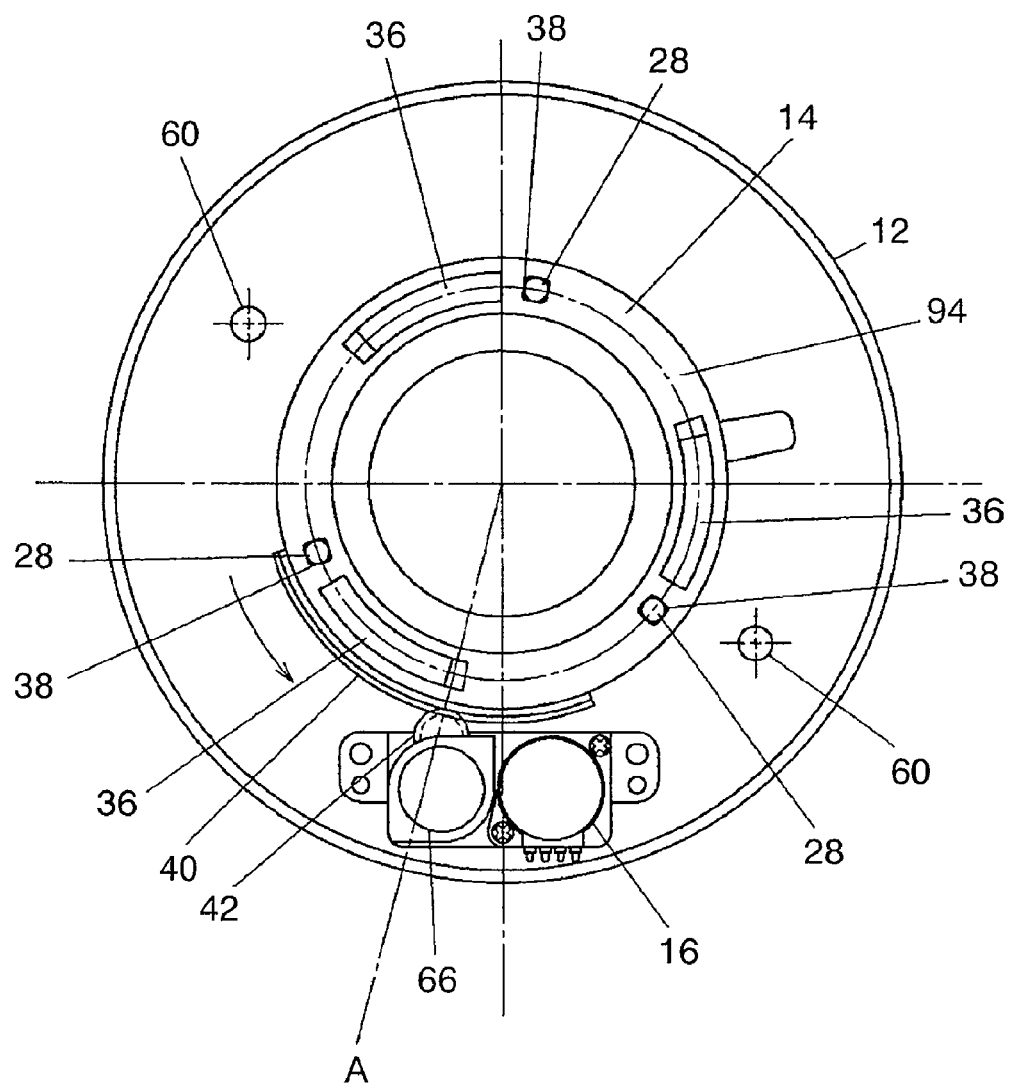
FIG. 5 is a sectional view on arrow C-D of FIG. 2 showing the photographing apparatus seen in the direction of the arrow.

Next, the relation between movable portion 14 and image pickup device holding portion 18 is described. FIG. 5 is a sectional view on arrow C-D of FIG. 2 seen in the direction of the arrow. As shown in FIG. 5, movable portion 14 has three cam relief portions 36, which are concave portions as recesses for three inclined portions 50 of image pickup device holding portion 18, and three indent portions 38, in which three spheres 28 provided so as to be brought into contact with three inclined portions 50 are disposed, on the surface opposite to the surface facing lens holding portion 12, that is to say, on the surface facing image pickup device holding portion 18. Since three spheres 28 are disposed inside indent portions 38, the positions thereof are fixed with respect to movable portion 14. Furthermore, indent portion 38 is formed in a size having some degree of clearance with respect to sphere 28 so that sphere 28 is rotated in indent portion 38. Three indent portions 38 are formed respectively so that three spheres 28 are disposed at equal distances and equal angles with respect to the center of the optical axis, that is to say, disposed in the positions at the vertex of a regular triangle. It is desirable that one of three spheres 28 is disposed so that it passes line segment A shown in FIG. 5 which links a central axis of the rotating operation of movable portion 14 and a point in which gear portion 42 is brought into contact with movable portion 14. When it is disposed in this way, because sphere 28 is a rigid body, it is possible to reduce deformation of movable portion 14 when gear portion 42 urges movable portion 14.

Furthermore, as shown in FIG. 4 or 5, in at least a part of the outer circumferential part of movable portion 14, gear portion 40 is provided so as to be engaged into gear portion 42 at the side of driving portion 16 via planetary gear portion 66 by driving portion 16. With such a configuration, by rotating driving portion 16, movable portion 14 can be rotated around the optical axis.

Figure 6:
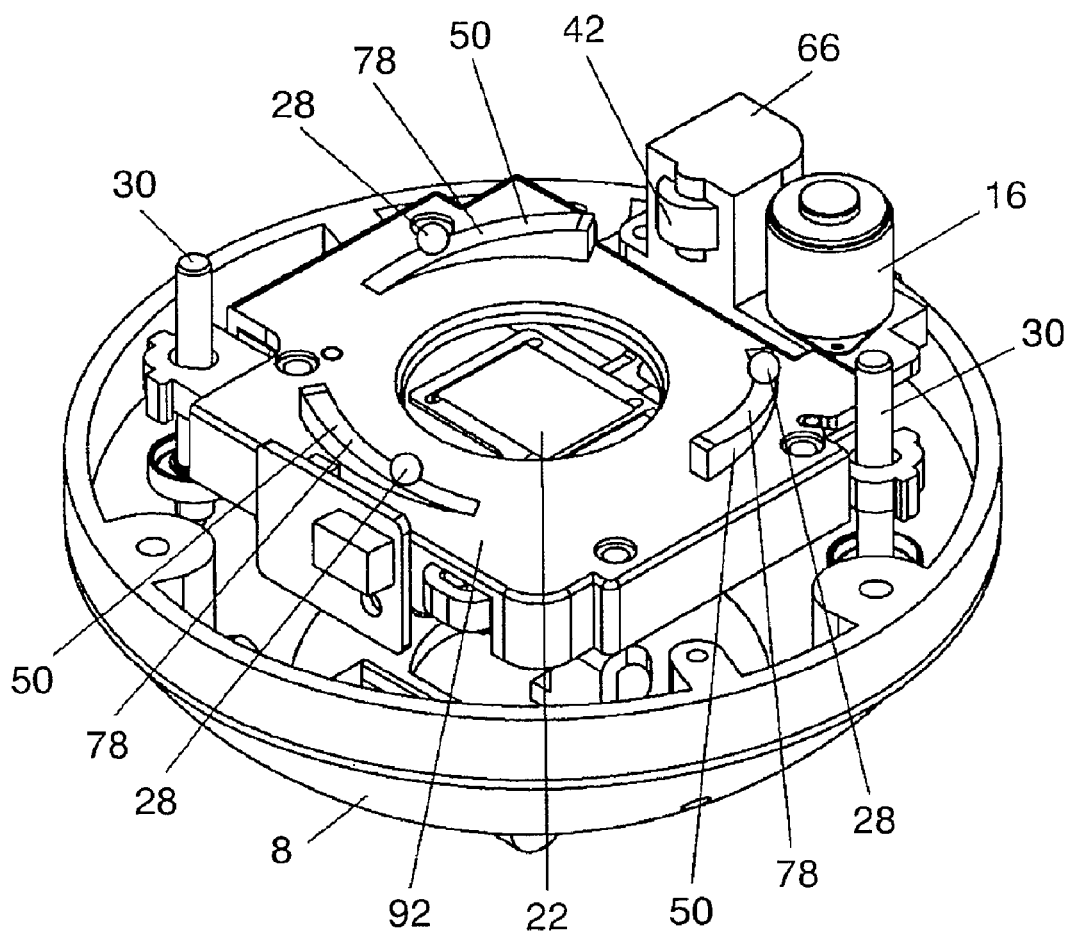
FIG. 6 is a perspective view showing the photographing apparatus in a state in which a lens cover portion, a lens portion, an upper case, a lens attachment portion, and a movable portion are removed.

Herein, a surface of image pickup device holding portion 18 facing movable portion 14 is described. FIG. 6 is a perspective view showing one example of photographing apparatus 2 in a state in which lens cover portion 4, lens portion 10, upper case 6, lens attachment portion 12, and movable portion 14 are removed. As shown in FIG. 6, image pickup device holding portion 18 is provided with three inclined portions 50 having the same wedge shape. As mentioned above, spheres 28 disposed inside indent portions 38 of movable portion 14 are rotated in a state in which they are held in indent portion 38 of movable portion 14 while they are brought into contact with inclined surfaces 78 on three inclined portions 50 in accordance with the rotation of movable portion 14.

Thus, since spheres 28 rotate and move on three inclined portions 50 in accordance with the rotation of movable portion 14, friction generated between movable portion 14 and image pickup device holding portion 18 can be reduced and catch and the like can be reduced. Furthermore, by disposing sphere 28 as a rigid body between image pickup device holding portion 18 and movable portion 14, as compared with the case where a material such as resin having a low rigidity is used, a configuration having an excellent shock resistance property can be realized. Note here that spheres 28 may not be necessarily rotated. Since spheres 28 and lens attachment portion 12 as well as spheres 28 and movable portion 14 are respectively brought into point contact with each other, it is possible to reduce friction at the time of the rotation of movable portion 14.

Furthermore, three inclined portions 50 are formed so that the diameters of three spheres 28 are equal to each other, the depths to bottom surface 76 of three indent portions 38 of movable portion 14 are also equal to each other, and the heights of the mountain from surface 92 of image pickup device holding portion 18 to inclined surface 78 of inclined portion 50 at the position in which inclined portion 50 and sphere 28 are brought into contact with each other are the same in three inclined portions 50. Therefore, bottom surface 76 of indent portion 38 of movable portion 14 and surface 92 of image pickup device holding portion 18 are kept in parallel with each other.

Figure 7A:
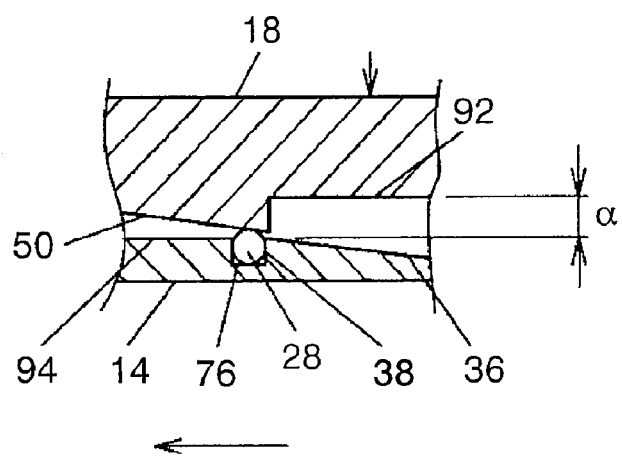
FIG. 7A is a view showing a relation between an image pickup device holding portion and a movable portion in the photographing apparatus.
Figure 7B:
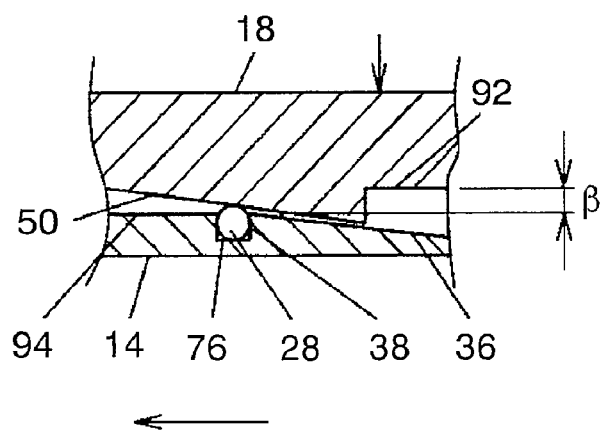
FIG. 7B is a view showing a relation between an image pickup device holding portion and a movable portion in the photographing apparatus.
Figure 7C:
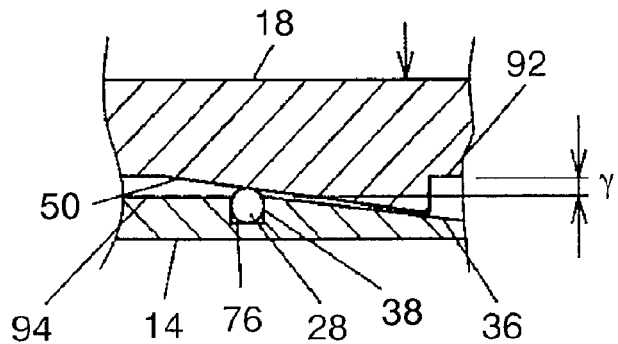
FIG. 7C is a view showing a relation between an image pickup device holding portion and a movable portion in the photographing apparatus.

Herein, the relation of inclined portion 50 of image pickup device holding portion 18, sphere 28, and movable portion 14 is described in some detail. FIGS. 7A to 7C are views showing the relation between image pickup device holding portion 18 and movable portion 14 in photographing apparatus 2 in an exemplary embodiment of the present invention. Since the relations between three inclined portions 50 and three spheres 28 are equal to each other, FIGS. 7A to 7C show the relation between one pair of inclined portion 50 and sphere 28.

Firstly, it is assumed that the relation between sphere 28 disposed in indent portion 38 of movable portion 14 and inclined portion 50 of image pickup device holding portion 18 is in the state shown in FIG. 7A. The distance between surface 92 of image pickup device holding portion 18 and surface 94 of movable portion 14 at this time is defined as α. Image pickup device holding portion 18 is urged by elastic portion 32 in the downward direction of the paper of FIGS. 7A to 7C.

From this state, movable portion 14 is moved to the left direction (in the direction shown by an arrow) in FIG. 7A (movable portion 14 is rotated in the direction shown by the arrow in FIG. 5). Then, as shown in FIG. 7B, sphere 28 of movable portion 14 is brought into contact with a lower part of inclined surface 78 of inclined portion 50, and the distance between surface 92 of image pickup device holding portion 18 and surface 94 of movable portion 14 becomes distance β that is smaller than distance α.

Furthermore, from the state shown in FIG. 7B, movable portion 14 is moved to the left direction in the drawing. Then, as shown in FIG. 7C, sphere 28 of movable portion 14 is brought into contact with a further lower part of inclined portion 50, and the distance between surface 92 of image pickup device holding portion 18 and surface 94 of movable portion 14 becomes distance γ that is further smaller than distance β.

On the contrary, in order to increase the distance between movable portion 14 and image pickup device holding portion 18, movable portion 14 is rotated in the direction opposite to the direction described in the above-mentioned example. That is to say, according to photographing apparatus 2 of an exemplary embodiment of the present invention, by rotating movable portion 14, the position of image pickup device holding portion 18 with respect to movable portion 14 can be changed.

Furthermore, as mentioned above, in the positions in which three inclined portions 50 and three spheres 28 are brought into contact with each other, since the diameters of three spheres 28 are equal to each other and the heights of the mountains of inclined portions 50 of image pickup device holding portion 18 are equal to each other, the distance between surface 92 of image pickup device holding portion 18 and surface 94 of movable portion 14 can be changed in a state in which they are always in parallel with each other. Thus, the interval between image pickup device 22 attached to image pickup device holding portion 18 and lens portion 10 can be changed in a state in which the direction of the image pickup surface is made to be constant. For example, when the direction of the image pickup surface is made to be perpendicular to the direction of the optical axis of lens portion 10, by rotating movable portion 14, the interval between the image pickup surface and lens portion 10 can be adjusted in a state in which the direction of the image pickup surface is made to be perpendicular to the optical axis of the lens portion 10.

Figure 8:
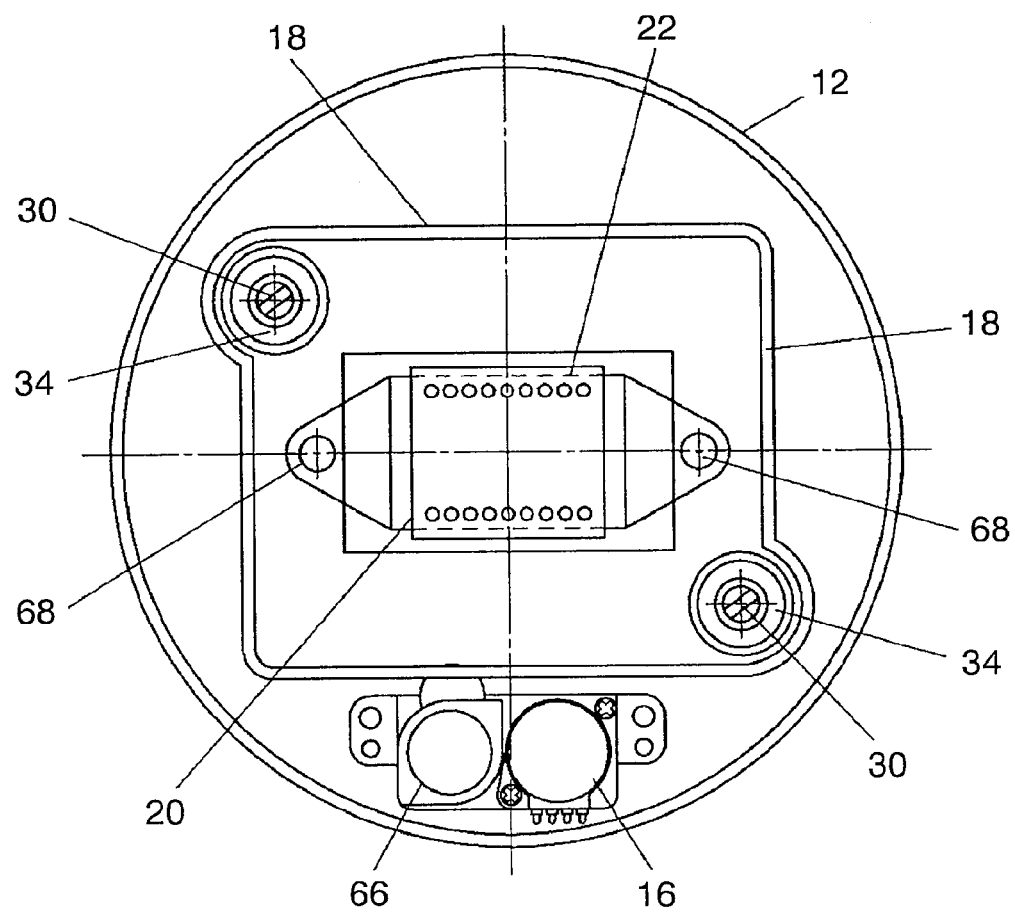
FIG. 8 is a sectional view on arrow A-B of FIG. 2 showing the photographing apparatus seen in the direction of the arrow.

Next, an attachment structure of image pickup device holding portion 18 is described. FIG. 8 is a sectional view on arrow A-B of FIG. 2 seen in the direction of the arrow. As shown in FIG. 8, image pickup device 22 is attached to substrate 20, substrate 20 is attached to image pickup device holding portion 18 by screw portion 68. Image pickup device holding portion 18 is elastically held by elastic portion 32 via presser portion 34 by using two screw portions 30 provided symmetrically with respect to the center of the optical axis.

Figure 9:
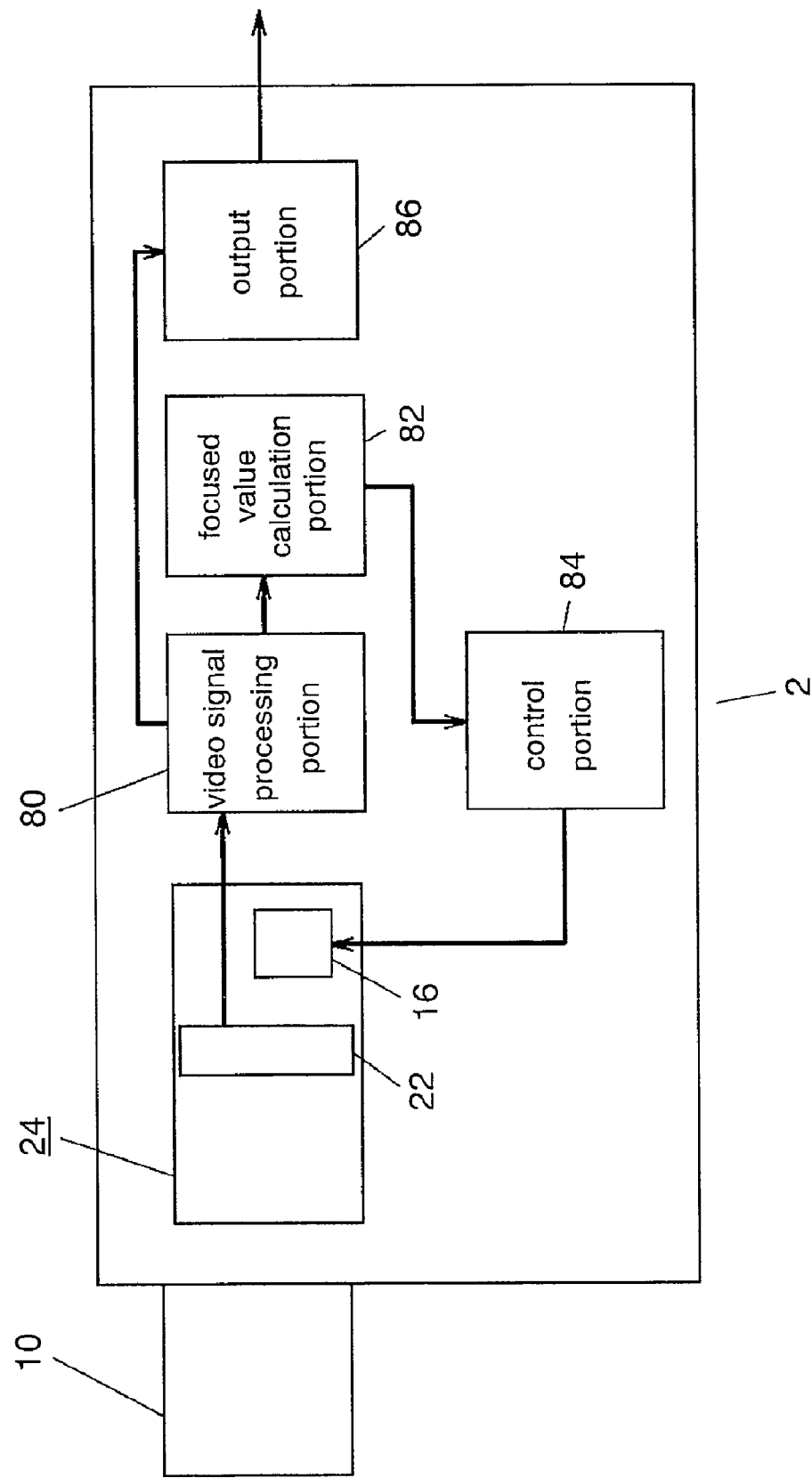
FIG. 9 is a block diagram showing a configuration of the photographing apparatus.

Herein, an electric configuration of photographing apparatus 2 is described. FIG. 9 is a block diagram showing a configuration of photographing apparatus 2 in accordance with an exemplary embodiment of the present invention.

As shown in FIG. 9, photographing apparatus 2 includes video signal processing portion 80 for performing video signal processing with respect to an electric signal output from image pickup device 22; focused value calculation portion 82 for multiplying a predetermined value of frequency component (high frequency component) from the video signal output from video signal processing portion 80 and calculating the multiplied value as a focused value; and control portion 84 for controlling driving portion 16 provided in image pickup device driving apparatus 24 so as to adjust the position of image pickup device 22 in the optical axis direction to a position in which the focused value formed by calculation portion 82 becomes maximum. Furthermore, image information output from video signal processing portion 80 is output to the outside of photographing apparatus 2 via output portion 86. In this way, since in photographing apparatus 2 in accordance with an exemplary embodiment of the present invention, driving portion 16 can automatically move the position of image pickup device 22 in the optical axis direction to the position in which the focused value becomes maximum, it is always possible to photograph a sharply focused image. Note here that focused value calculated by focused value calculation portion 82 is also output to the outside from output portion 86, and with reference to the output focused value, control portion 84 can be controlled from other equipment provided outside.

As mentioned above, a monitoring camera apparatus can be configured by using image pickup device driving apparatus 24 and photographing apparatus 2 in this exemplary embodiment.

Specifically, an image pickup device driving apparatus of the present invention is introduced into a monitoring camera apparatus for photographing a color image in the visible light region by disposing an infrared-light cut filter on the optical axis when the surrounding is bright, and photographing a monochrome image by using a ray of light including one in the wavelength of the infrared region by removing the infrared-light cut filter disposed on the optical axis when the surrounding is dark. In such a monitoring camera apparatus, when the illumination is changed, the infrared-light cut filter is disposed or withdrawn on the optical axis (hereinafter, this operation is referred to as attachment and detachment), or when the wavelength of the ray of light to be used in photographing is different, and the like, the optical path length varies, and the optimum focused position from the lens to a photographing surface on which a photoelectric transducer is disposed in the image pickup device is changed. When the infrared-light cut filter is attached or detached by using the image pickup device driving apparatus of the present invention, by driving the driving portion with respect to the control portion, an image pickup device can be automatically moved to the position in which the focused value becomes maximum in the optical axis direction. Therefore, a right-focused sharp image can be photographed regardless of the brightness of the surrounding.

Note here that this exemplary embodiment describes a configuration in which image pickup device holding portion 18 that holds image pickup device 22 is provided with three inclined portions 50 and movable portion 14 is provided with three spheres 28 that are brought into contact with three inclined portions 50. However, an image pickup device driving apparatus and a photographing apparatus of the present invention are not limited to this configuration. For example, on the contrary, the present invention encompasses a configuration in which image pickup device holding portion 18 is provided with three spheres 28 and movable portion 14 is provided with three inclined portions 50.

Furthermore, this exemplary embodiment shows a configuration in which lens attachment portion 12 is provided with six spheres 26 and movable portion 14 is provided with sphere receiver surface 48 that is brought into contact with six spheres 26. However, an image pickup device driving apparatus and a photographing apparatus of the present invention are not limited to this configuration. For example, on the contrary, the present invention encompasses a configuration in which lens attachment portion 12 is provided with sphere receiver surface 48 and movable portion 14 is provided with six spheres 26.

Furthermore, this exemplary embodiment describes a configuration in which six spheres 26 are disposed between lens attachment portion 12 and movable portion 14, and three spheres 28 are disposed between movable portion 14 and image pickup device holding portion 18. However, the present invention is not limited to this configuration. For example, the present invention encompasses a configuration in which spheres are disposed in any one of a portion between movable portion 14 and image pickup device holding portion 18 and a portion between lens attachment portion 12 and movable portion 14. From the viewpoint of practice, when spheres 26 and 28 are disposed in both portions, the friction can be further reduced.

Furthermore, this exemplary embodiment describes an example in which six spheres 26 are disposed between lens attachment portion 12 and movable portion 14. However, the present invention is not limited to this example. For example, the number of spheres to be disposed between lens attachment portion 12 and movable portion 14 is not limited as long as it is three or more.

Furthermore, this exemplary embodiment describes a configuration in which image pickup device holding portion 18 that holds image pickup device 22 is provided at the opposite side to lens portion 10 with respect to movable portion 14 and movable portion 14 is provided at the side of lens portion 10 with respect to image pickup device holding portion 18. However, an image pickup device driving apparatus and a photographing apparatus of the present invention are not limited to this configuration. For example, on the contrary, the present invention encompasses a configuration in which, the movable portion is disposed at the opposite side of the lens portion with respect to the image pickup device holding portion, and the image pickup device holding portion is provided at the side to the lens portion with respect to the movable portion. Note here that in this case, it is not necessary to provide a hole portion for allowing a ray of light to pass in the vicinity of the center of the movable portion.

Furthermore, this exemplary embodiment describes an example in which movable portion 14 is rotated, thereby moving image pickup device 22 in the optical axis direction. However, the present invention is not limited to this example.

For example, by forming three inclined portions 50 on lines that are parallel to each other and by moving movable portion 14 in the direction in which inclined portions 50 are formed (the direction perpendicular to the optical axis), image pickup device 22 can be moved in the optical axis direction.

Furthermore, this exemplary embodiment describes an example in which spheres 28 are disposed between image pickup device holding portion 18 and movable portion 14, and spheres 26 are disposed between movable portion 14 and lens attachment portion 12. However, an image pickup device driving apparatus and a photographing apparatus using the same in accordance with the present invention are not limited to this configuration. Herein, two other examples are described.

Figure 10:
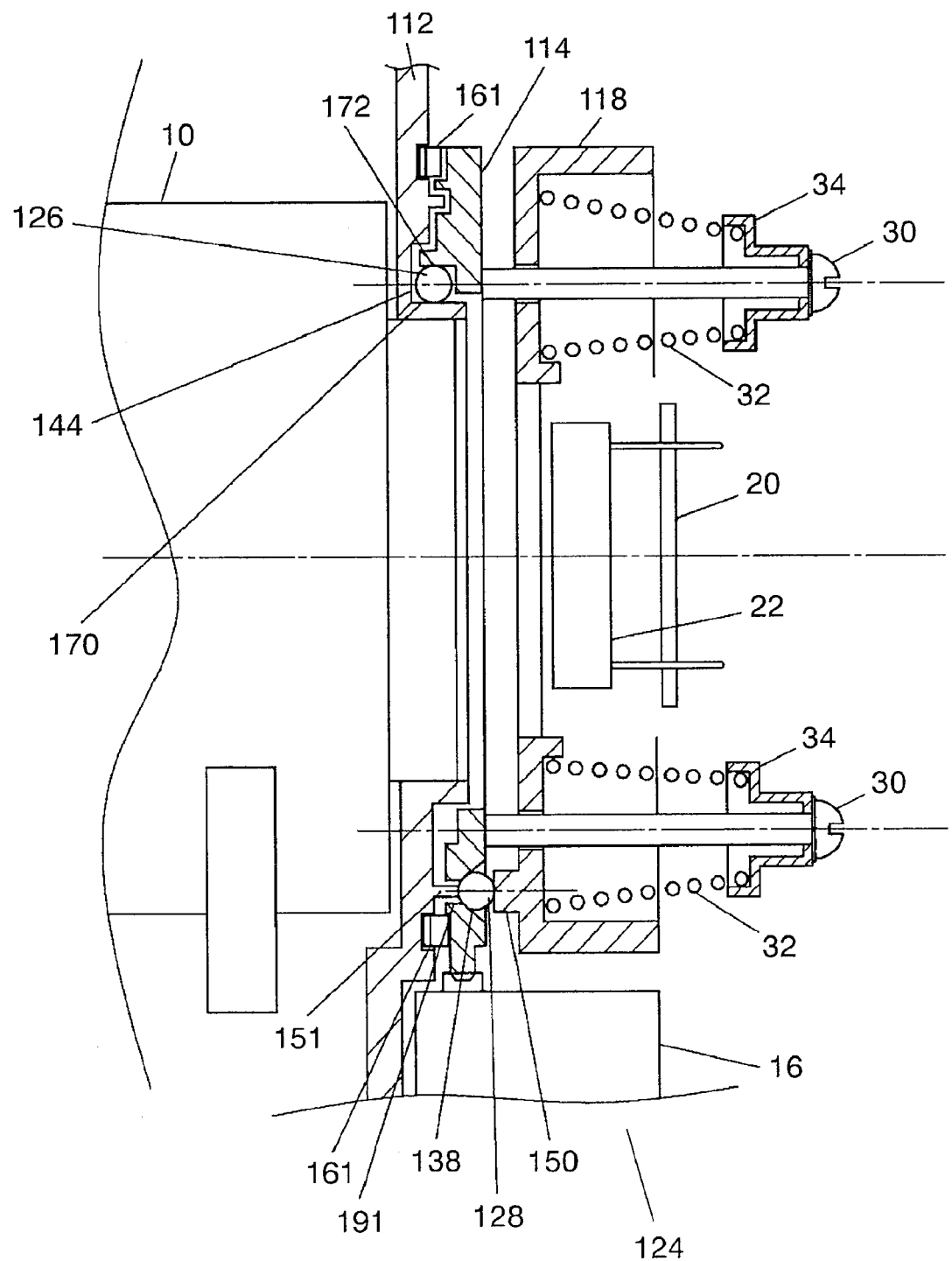
FIG. 10 is a view showing another example of an image pickup device driving apparatus.

FIG. 10 is a view showing another example of an image pickup device driving apparatus in accordance with an embodiment of the present invention. Also in image pickup device driving apparatus 124 shown in FIG. 10, spheres 128 are disposed between image pickup device holding portion 118 and movable portion 114. However, hole portion 191 is provided on the bottom portion of mortal-shaped indent portion 138 of movable portion 114, and sphere 128 is brought into contact with indent portion 138 and convex portion 151 provided on the surface facing movable portion 114 of lens attachment portion 112. That is to say, sphere 128 is held by inclined portion 150 of image pickup device holding portion 118 and convex portion 151 of lens attachment portion 112 in the optical axis direction, and positioned by indent portion 138 of the movable portion in the direction perpendicular to the optical axis. Note here that since movable portion 114 is urged in the right direction of the paper in FIG. 10 by spring portion 161 such as a plate spring and a washer provided between movable portion 114 and lens attachment portion 112, indent portion 138 of movable portion 114 is reliably brought into contact with sphere 128 and positioning of sphere 128 in the direction perpendicular to the optical axis can be performed.

Furthermore, in image pickup device driving apparatus 124, spheres 126 are disposed between movable portion 114 and lens attachment portion 112. Sphere 126 is positioned in the direction perpendicular to the optical axis by wall surface 170 of concave portion 144 of lens attachment portion 112 and wall surface 172 of movable portion 114. Note here that spheres 126 are not positioned in the optical axis direction and are in a state in which clearance is included.

Thus, also when image pickup device driving apparatus 124 shown in FIG. 10 is used, similar to the above-mentioned image pickup device driving apparatus 24, an effect of reducing a torque for rotating movable portion 114 can be achieved. Furthermore, according to image pickup device driving apparatus 124, the position in the optical axis direction is determined by image pickup device holding portion 118 and lens attachment portion 112, and the position in the direction perpendicular to the optical axis is determined by movable portion 114 and lens attachment portion 112. Therefore, load applied to movable portion 114 in the optical axis direction can be made to be substantially constant, thus reducing a torque for rotating movable portion 114.

Figure 11:
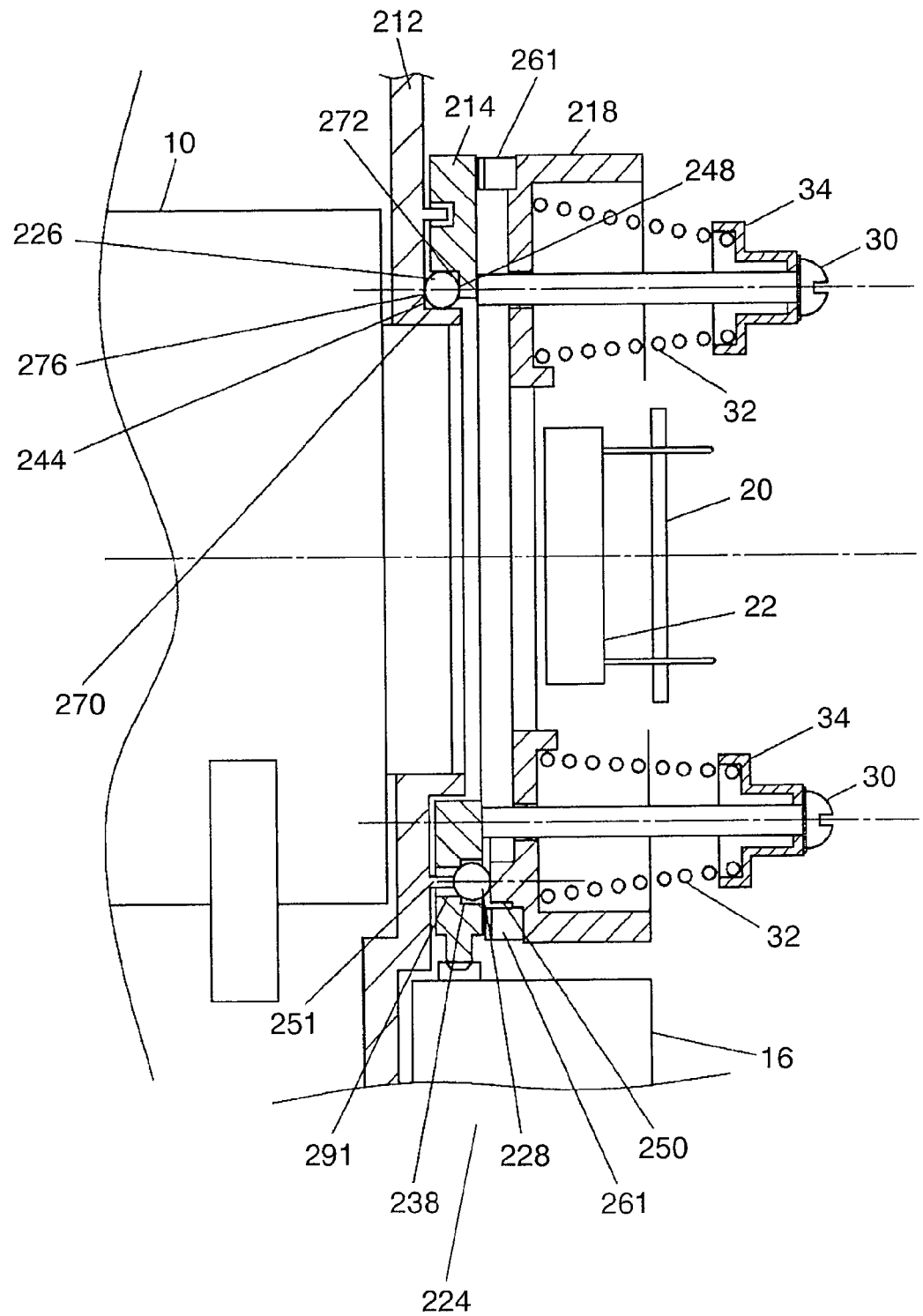
FIG. 11 is a view showing a further example of an image pickup device driving apparatus.

Furthermore, FIG. 11 is a view showing a further example of the image pickup device driving apparatus in accordance with an embodiment of the present invention. Also in image pickup device driving apparatus 224 shown in FIG. 11, spheres 228 are disposed between image pickup device holding portion 218 and movable portion 214. However, hole portion 291 is provided on the bottom portion of indent portion 238 of movable portion 214 and sphere 228 is brought into contact with indent portion 238 and convex portion 251 provided on the surface facing movable portion 214 of lens attachment portion 212. That is to say, sphere 228 is held by inclined portion 250 of image pickup device holding portion 218 and convex portion 251 of lens attachment portion 212 in the optical axis direction but held in a state in which clearance is included in the direction perpendicular to the optical axis.

Furthermore, in image pickup device driving apparatus 224, spheres 226 are disposed between movable portion 214 and lens attachment portion 212. Spheres 226 are positioned by wall surface 270 of concave portion 244 of lens attachment portion 212 and wall surface 272 of movable portion 214 in the direction perpendicular to the optical axis and is positioned between sphere receiver surface 248 of movable portion 214 and bottom surface 276 of concave portion 244 of lens attachment portion 212 in the optical axis direction. Note here that since movable portion 214 is urged in the left direction of the paper in FIG. 11 by spring portion 261 such as a plate spring or a washer and the like, which are provided between movable portion 214 and image pickup device holding portion 218, by bringing sphere receiver surface 248 of movable portion 214 into contact with spheres 226, spheres 226 can be held reliably between sphere receiver surface 248 and bottom surface 276 of lens attachment portion 212.

Thus, even when image pickup device driving apparatus 224 shown in FIG. 11 is used, an effect of reducing a torque for rotating movable portion 214 can be realized similar to the above-mentioned image pickup device driving apparatus 24. Furthermore, according to image pickup device driving apparatus 224, since all the surfaces except for inclined surfaces of inclined portions 250 receiving spheres 226 and 228 can be formed as a vertical surface or a horizontal surface, a configuration having an excellent productivity can be realized.

Note here that an image pickup device driving apparatus and a photographing apparatus of the present invention are not limited to the use in a monitoring camera apparatus. For example, they can be installed in any well-known photographing apparatuses including a video camera, a digital camera, and the like.

INDUSTRIAL APPLICABILITY

As mentioned above, when an image pickup device driving apparatus and a photographing apparatus using the same in accordance with the present invention are used, an excellent effect capable of moving an image pickup device in the optical axis direction smoothly with a relatively small driving force is exhibited. They are useful for a photographing apparatus such as a monitoring camera apparatus and a video camera apparatus, in particular, an image pickup device driving apparatus for moving an image pickup device in the direction of the optical axis of the lens portion and a photographing apparatus using the same, and the like.

The invention claimed is:

1. An image pickup device driving apparatus, comprising:
an image pickup device holding portion for holding an image pickup device with an image pickup surface directed in a predetermined direction and being capable of moving in an optical axis direction;
a movable portion provided facing the image pickup device holding portion and being capable of moving with respect to the image pickup device holding portion;
three inclined portions provided on a surface of any one of the movable portion and the image pickup device holding portion, which faces an other of the movable portion and the image pickup device holding portion;
three spheres provided on a surface of the other of the movable portion and the image pickup device holding portion, which faces the three inclined portions, in a way in which the three spheres are respectively brought into contact with the three inclined portions;
a driving portion for moving the movable portion so as to change positions in which the three inclined portions and the three spheres are brought into contact with each other and to move the image pickup device held in the image pickup device holding portion in the optical axis direction with a surface direction of the image pickup surface maintained;
a lens attachment portion to which a lens portion is attached; and
a plurality of spheres provided between the movable portion and the lens attachment portion,
wherein the movable portion is capable of moving with respect to the lens attachment portion via the plurality of spheres.

2. The image pickup device driving apparatus of claim 1, wherein the movable portion is rotatable around the optical axis direction, and the driving portion rotates the movable portion.

3. The image pickup device driving apparatus of claim 1 or 2, wherein the three spheres have equal diameters.

4. The image pickup device driving apparatus of claim 3, wherein the three spheres are rotatably provided on the surface of the other of the movable portion and the image pickup device holding portion, which faces the three inclined portions.

5. The image pickup device driving apparatus of claim 4, wherein the three spheres are disposed inside indent portions provided on the surface of the other of the movable portion and the image pickup device holding portion, which faces the three inclined portions.

6. The image pickup device driving apparatus of claim 1, wherein the plurality of spheres are rotatably provided on a surface of any one of the movable portion and the lens attachment portion, which faces an other of the movable portion and the lens attachment portion.

7. The image pickup device driving apparatus of claim 6, wherein the plurality of spheres are disposed inside concave portions provided on a surface of the one of the movable portion and the lens attachment portion, which faces the other of the movable portion and the lens attachment portion.

8. The image pickup device driving apparatus of claim 1, comprising an elastic portion for urging the image pickup device holding portion in one direction along the direction of the optical axis,
wherein the movable portion provides the image pickup device holding portion with an urging force in a direction opposite to the one direction.

9. The image pickup device driving apparatus of claim 1, wherein the driving portion is a rotary motor.

10. A photographing apparatus comprising:
a lens portion;
an image pickup device;
an image pickup device driving apparatus of claim 1; and
a video signal processing portion for performing video signal processing with respect to a signal output from the image pickup device.

* * * * *